Patented June 22, 1926.

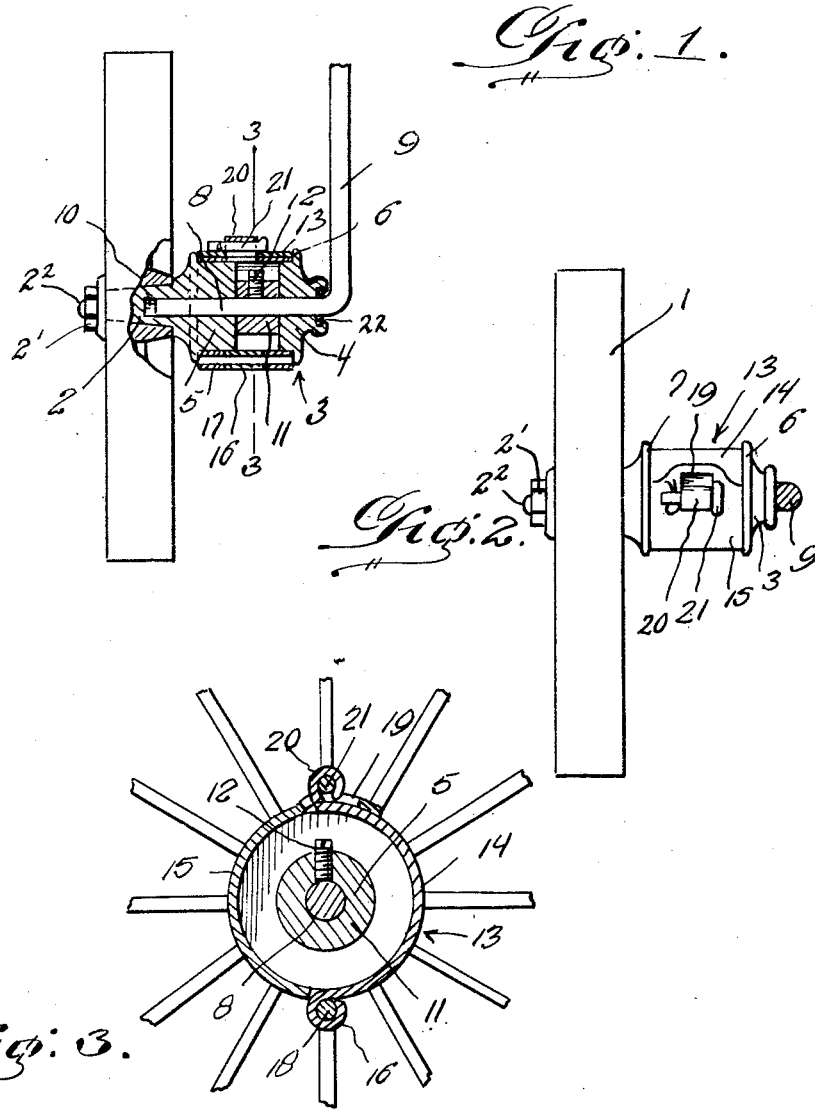

1,589,445

UNITED STATES PATENT OFFICE.

JOHN ULRICH, OF MAX, NORTH DAKOTA, ASSIGNOR OF ONE-HALF TO E. W. BURKE, OF MAX, NORTH DAKOTA.

PLOW-WHEEL ATTACHMENT.

Application filed September 17, 1925. Serial No. 56,950.

This invention relates to an attachment for the furrow wheel of an agricultural machine, such as a gang or sulky plow, or any other type of plow of the wheeled type.

One of the important objects of the present invention is to provide an attachment which is of such construction as to prevent vegetations, such as weeds, long grass or the like from becoming entangled on the inside boxing or collar of the furrow wheel and winding around the axle on which the wheel is mounted between the hub and the lower portion of the standard. Ordinarily with the furrow wheels now generally in use, considerable difficulty is experienced in preventing the winding around of such vegetation on the axle, and as a result, the furrow wheel will not rotate freely on the axle, and will drag instead of revolve, and oftentimes the vegetation which has been entangled will be impregnated with grease and sand so that it affects the boxing and collar.

One of the important objects of the present invention is to provide an attachment which will overcome the above disadvantages and at all times permit the revolving of the furrow wheel, the attachment being particularly adapted for use on furrow wheels and includes a collar and set screw which is provided for the purpose of regulating the distance to which the wheel may be placed or moved on the axle of the standard so as to adjust the distance from the agricultural implement at which the furrow wheel is to operate.

A further object is to provide a furrow wheel attachment of the above mentioned character which may be readily and easily placed in position over the collar so as to protect the same and the set screw, said attachment fitting around the boxing, and being readily disengaged therefrom whenever it is necessary.

A further object is to provide an attachment of the above mentioned character which is simple in construction, inexpensive, strong and durable and further well adapted to the purpose for which it is designed.

Other objects and advantages of the invention will become apparent during the course of the following description taken in connection with the accompanying drawing.

In the accompanying drawing forming a part of this application, and in which like numerals designate like parts throughout the same:

Figure 1 is a sectional view through the boxing, set screw, and collar associated with a furrow wheel showing the manner in which the same is arranged on the axle, and illustrating my improved attachment which fits around the boxing.

Figure 2 is a top plan view, and

Figure 3 is a vertical sectional view taken approximately on line 3—3 of Figure 1.

In the drawing wherein for the purpose of illustration is shown the preferred embodiment of my invention, the numeral 1 designates generally a furrow wheel of any conventional type, the same being adapted to be mounted on the hub 2. A lock nut 2' is threaded on the reduced outer end $2^2$ of the hub to prevent the displacement of the wheel from the hub. The inner end of the hub is enlarged as indicated generally at 3, and is disposed adjacent the inner side of the wheel, as is more clearly illustrated in Fig. 1. The enlarged portion of the hub is furthermore divided so that the spaced sections 4 and 5 are formed. An annular flange 6 is formed on the outer face of the section 4, whereas a similar flange 7 is formed on the outer face of the intermediate portion of the other section 5. The purpose of these flanges will hereinafter be more fully described.

The hub is adapted to be rotatably mounted on the axle 8, which is formed on the lower end of the standard 9, the latter forming a part of any well known type of gang or sulky plow, the axle being disposed laterally with respect to the standard. The axle extends longitudinally through the inner end of the hub, the section 4 being provided with a suitable opening which registers with the longitudinally extending socket 10 formed in the section 5, and in which the free end of the axle is disposed. This will permit the longitudinal movement of the axle with respect to the hub. For the purpose of securing the hub on the axle 8 in any adjusted position with respect to the standard 9, there is provided the collar 11, the same fitting on the axle and disposed between the complementary sections of the enlarged inner end portion 3 of the hub 2, in the manner clearly illustrated in Figure 1. A set screw 12 is threaded through a suitable transversely extending threaded opening provided therefor in the collar, and engages the axle for securing the collar and holding the same in the desired adjusted position on the axle. The collar is of a diameter less than the diameter of the enlarged inner end portion 3 of the hub 2 so that the outer end of the set screw when the latter is in its locked position with respect to the axle will not extend beyond the outer peripheral face of the enlarged inner end of the hub.

With the type of furrow wheels and mounting therefor now generally in use, considerable difficulty has been experienced in preventing vegetation such as weeds, tall grass, or the like from winding around the hub or boxing, as well as between the sections of the inner end of the hub and around the set screw. As a result of the collection of this vegetation on the wheel, the revolving of the wheel on the axle is prevented, and thus prevents the proper operation of the furrow wheel in carrying out the purposes for which it is designed. In order to overcome the above disadvantages and to provide a means for preventing the collection of such vegetations around the hub or boxing, so that the furrow wheel will rotate freely on the axle, I have provided an attachment which comprises a sleeve or casing designated generally by the numeral 13. This sleeve includes the complementary semi-circular sections 14 and 15 respectively which are adapted to encircle the sections 4 and 5 of the enlarged portion 3 of the hub, and the edges of the sleeve will abut the respective flanges 6 and 8. The section 14 is secured in any suitable manner to the peripheral faces of the sections 4 and 5, so as to provide a unitary structure and to further hold said sections in proper spaced relation with respect to each other. The complementary semi-circular sections are provided with the interfitting looped portions 16 and 17 respectively at one end for receiving the pin 18, whereby a hinged joint is provided. In this manner, the complementary section 15 may be swung open or closed in a simple and efficient manner.

The opposite end of the complementary section 15 has formed therein the elongated slot 19 for receiving the upwardly disposed portion 20 formed on the opposite end of the other section 14. This upwardly disposed portion 20 is bent back upon itself to form a loop for receiving a suitable locking pin or key 21, the free ends of which engage the outer face of the adjacent portion of the section 15 so that the sections of the sleeve will be held in a locked position around the inner end of the hub or boxing, and will completely cover the collar and set screw so that there will be no possibility of any vegetation coming in contact with the collar or set screw, and winding around the axle at that point.

For the purpose of retaining a lubricant in the hub, around the axle, a felt washer 22 is associated with the outer end portion of the section 4 of the enlarged portion of the hub in the manner as shown more clearly in Figure 1.

The simplicity in which my device is constructed enables the same to be readily and easily attached and will be strong and durable, as well as inexpensive in its manufacture.

While I have shown the preferred embodiment of my invention it is to be understood that minor changes in the size, shape, and arrangement of parts may be resorted to without departing from the spirit of the invention and the scope of the appended claims.

Having thus described the invention, what I claim as new and desire to secure by Letters Patent is:—

1. In combination with a furrow wheel having a hub extending outwardly therefrom, and an axle extending into the hub, the outwardly extending portion of the hub being divided to provide a pair of spaced sections, a collar surrounding the axle between the spaced sections, a set screw threaded through the collar and engaging the axle for adjustably securing the hub on the axle, of a sectional casing extending around the sections of the hub and enclosing the collar and the set screw, a portion of the casing being secured to the peripheral faces of the sections to provide a unitary structure.

2. In combination with a furrow wheel having a hub extending outwardly therefrom, and an axle extending into the hub, the outwardly extending portion of the hub being divided to provide a pair of spaced sections, a collar surrounding the axle between the spaced sections, a set screw threaded through the collar and engaging the axle for adjustably securing the hub on the axle, of a sectional casing extending around the sections of the hub and enclosing the collar and the set screw, a portion of the casing being secured to the peripheral faces of the sections to provide a unitary structure, said casing including a pair of complementary semi-circular sections hingedly secured at one end, one of the sections being secured to the peripheral faces of the sections of the outer end of the hub, and means for securing the opposite ends of the sections of the casing.

In testimony whereof I affix my signature.

JOHN ULRICH.